US012563421B2

(12) United States Patent　(10) Patent No.: US 12,563,421 B2

Opedal　(45) Date of Patent: Feb. 24, 2026

(54) PREDICTING AND MITIGATING FAILURE OF TELECOMMUNICATIONS NETWORK EQUIPMENT

(71) Applicant: T-Mobile USA, Inc., Bellevue, WA (US)

(72) Inventor: Jan Olav Opedal, Ellensburg, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 315 days.

(21) Appl. No.: 18/487,179

(22) Filed: Oct. 16, 2023

(65) Prior Publication Data

US 2025/0126495 A1　Apr. 17, 2025

(51) Int. Cl.
| | |
|---|---|
| *H04W 24/10* | (2009.01) |
| *H04L 41/16* | (2022.01) |
| *H04L 43/0817* | (2022.01) |
| *H04W 24/04* | (2009.01) |
| *H04L 43/16* | (2022.01) |

(52) U.S. Cl.
CPC ............. *H04W 24/04* (2013.01); *H04L 41/16* (2013.01); *H04L 43/0817* (2013.01); *H04W 24/10* (2013.01); *H04L 43/16* (2013.01)

(58) Field of Classification Search
CPC ...... H04W 24/04; H04W 24/10; H04L 41/16; H04L 43/0817; H04L 43/16
See application file for complete search history.

(56) References Cited

U.S. PATENT DOCUMENTS

| | | | |
|---|---|---|---|
| 8,045,476 | B2 | 10/2011 | Mehta et al. |
| 8,886,197 | B2 | 11/2014 | Lindoff et al. |
| 9,535,808 | B2 | 1/2017 | Bates et al. |
| 9,842,302 | B2 | 12/2017 | Bates et al. |
| 10,768,605 | B2 | 9/2020 | Dalal et al. |
| 11,678,018 | B2 | 6/2023 | Gowda et al. |
| 11,751,072 | B2 | 9/2023 | Bai et al. |
| 2014/0257913 | A1 | 9/2014 | Ball et al. |

(Continued)

FOREIGN PATENT DOCUMENTS

| | | |
|---|---|---|
| JP | 7135070 B2 | 9/2022 |
| WO | 2021139881 A1 | 7/2021 |

*Primary Examiner* — Chuong A Ngo
(74) *Attorney, Agent, or Firm* — Perkins Coie LLP

(57) ABSTRACT

A system uses a trained machine learning model to predict a likelihood of failure of telecommunications network equipment housed in equipment boxes. The model can be configured to receive, as input, (1) air temperature in an environment proximate to the equipment and (2) attributes of fans in the equipment boxes. The system monitors a set of equipment boxes using the model by processing the received measurements of air temperature and attributes of fans to predict likelihoods of failure of the monitored equipment boxes. Network performance associated with equipment housed in the monitored equipment boxes is observed. Upon detecting the observed network performance of telecommunications network equipment within a target equipment box is below a performance threshold and detecting the predicted likelihood of failure of the target equipment box is below a failure threshold, the model is retrained based on an error value associated with the predicted likelihood of failure.

20 Claims, 5 Drawing Sheets

(56) References Cited

U.S. PATENT DOCUMENTS

| | | | |
|---|---|---|---|
| 2016/0241429 A1 | 8/2016 | Froehlich | |
| 2017/0331709 A1* | 11/2017 | Lam | F16C 19/52 |
| 2017/0344909 A1 | 11/2017 | Kurokawa et al. | |
| 2020/0162342 A1* | 5/2020 | Fattu | H04L 43/16 |
| 2021/0072272 A1 | 3/2021 | Linder et al. | |
| 2022/0036199 A1 | 2/2022 | Prasanna et al. | |
| 2022/0191592 A1 | 6/2022 | Gairuboina et al. | |
| 2022/0322195 A1 | 10/2022 | Tullberg et al. | |
| 2023/0094113 A1 | 3/2023 | Metzger et al. | |
| 2023/0246676 A1 | 8/2023 | Reeves | |
| 2023/0261728 A1 | 8/2023 | Zhou et al. | |
| 2023/0400847 A1 | 12/2023 | Guo et al. | |

* cited by examiner

500

PREDICTING AND MITIGATING FAILURE OF TELECOMMUNICATIONS NETWORK EQUIPMENT

BACKGROUND

Telecommunications networks include a large quantity of physical equipment to enable transmission of voice, data, and multimedia across geographic areas. This equipment can include access network equipment, which connects user equipment devices to the network, as well as backhaul equipment that transports data from the access network to the core network for further routing and processing. Some of the equipment in a telecommunications network is located in relatively temperature-controlled environments, such as access nodes that are placed inside buildings. However, much of a network's equipment is outdoors, subject to temperature fluctuations and other environmental conditions that may degrade the performance of the network equipment over time and potentially cause equipment failures.

BRIEF DESCRIPTION OF THE DRAWINGS

Detailed descriptions of implementations of the present invention will be described and explained through the use of the accompanying drawings.

Figure 1:
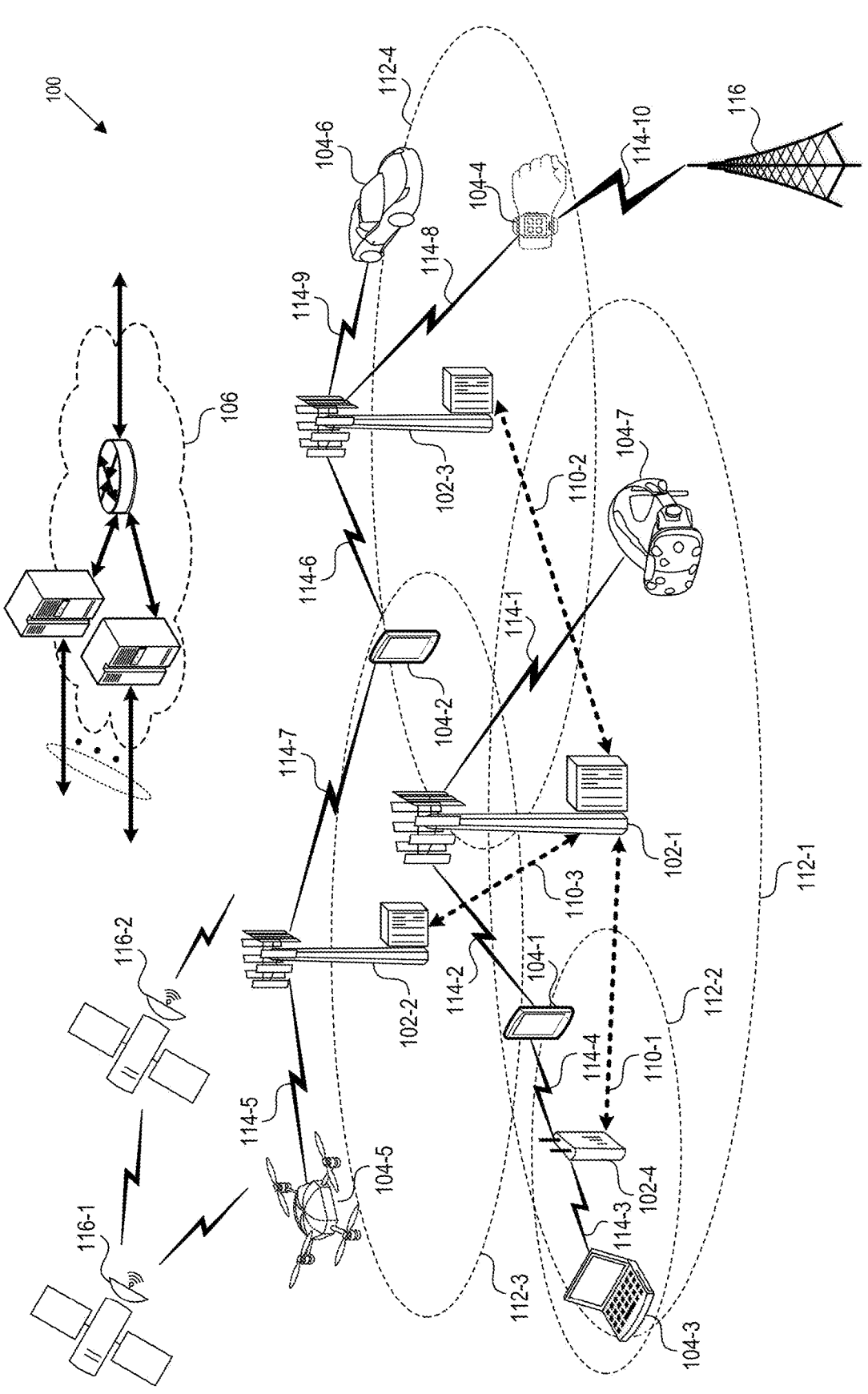
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Equipment in a telecommunications network is often subjected to environmental conditions that may degrade the performance of the equipment over time. Like many electronic systems, telecommunications equipment has a finite temperature range in which it can operate without physical damage to the equipment that inhibits its performance. If equipment fails or its performance is reduced due to temperature fluctuations, performance metrics of the telecommunications network in the geographic area of the damaged equipment is likely to suffer as well. For example, user equipment devices in a given area may not be able to connect to the network if the radio access equipment closest to the user devices has failed. Even if user equipment can establish a connection to the network, throughput or latency of the network may suffer if either the radio access equipment near the user equipment, or backhaul equipment anywhere in the network, has been damaged by high temperatures. The core network may also be unable to obtain data from the radio access or backhaul equipment to manage efficient operations of the network.

To mitigate the effects of equipment damage in a telecommunications network, an equipment failure prediction system according to implementations herein is configured to execute a trained machine learning model to predict likely equipment failures. The equipment failure prediction system can receive environmental data and fan data associated with equipment boxes that house telecommunications network equipment. The trained model employed by the system can output predicted likelihoods of equipment failure based weather parameters in an environment proximate to an equipment box and attributes of fans inside the equipment boxes. When the likelihood of equipment failure is greater than a failure threshold, the equipment failure prediction system can cause an action to remediate equipment failure, such as shifting communication loads handled by the failing equipment to other equipment, scheduling repair of the failing equipment, or notifying customers that network performance is likely to be impacted. The equipment failure prediction system can also observe network performance associated with network equipment. Upon detecting the observed network performance is below a performance threshold while the likelihood of failure of the equipment predicted by the model is greater than the failure threshold, the equipment failure prediction system can retrain the model based on an error in the model's predicted likelihood.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QoS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
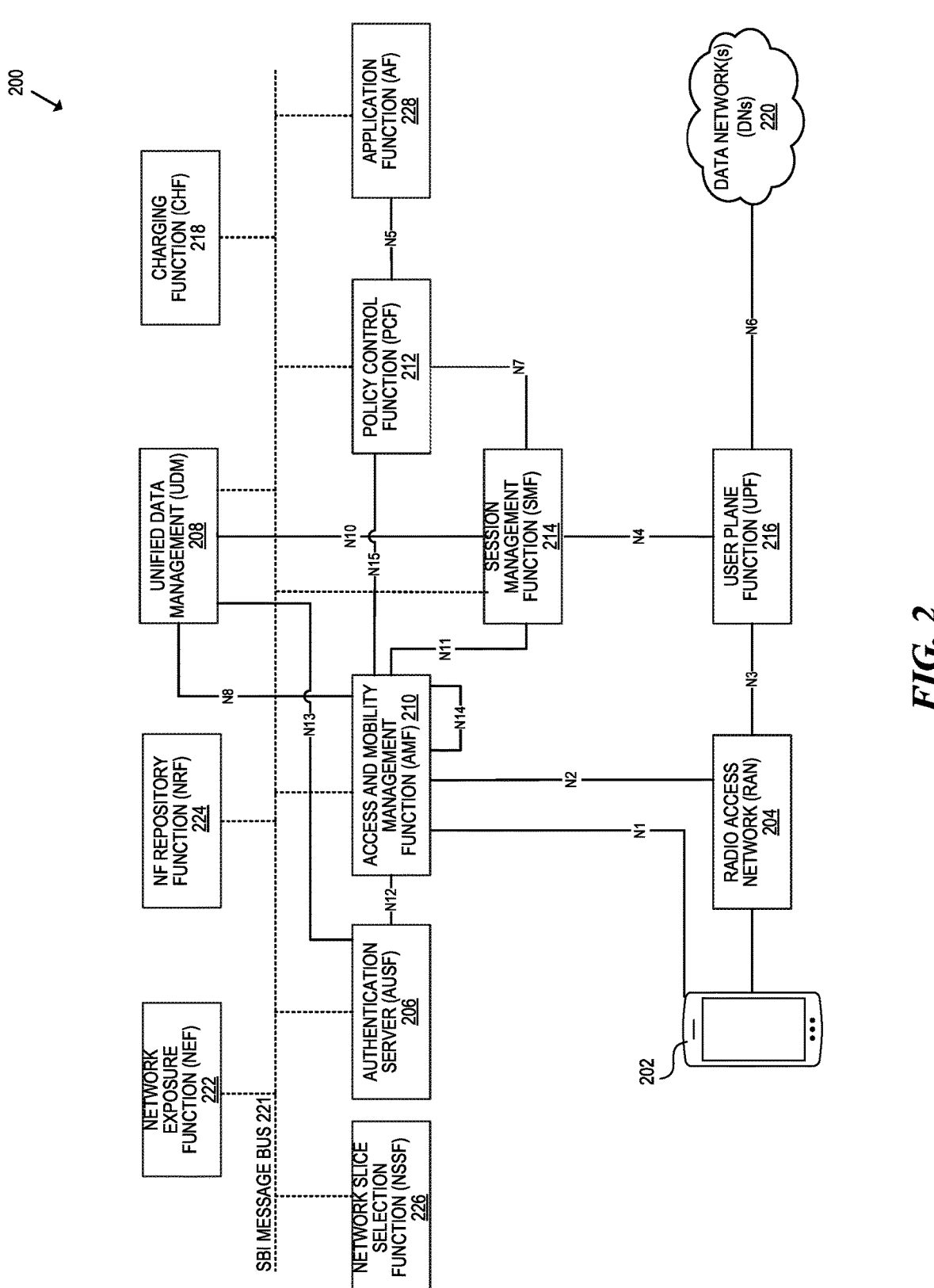
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Telecommunications Network Equipment Failure Prediction System

Figure 3:
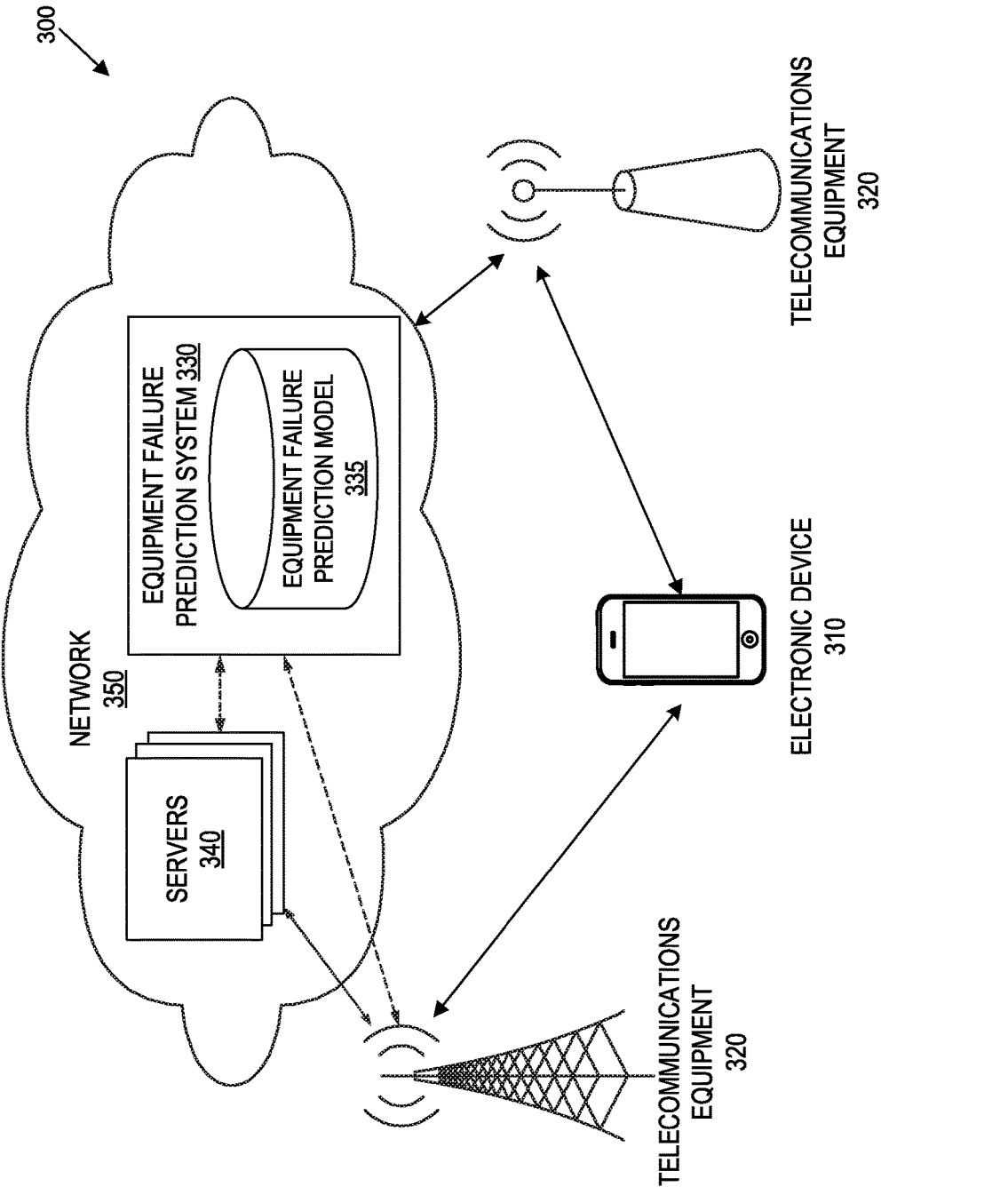
FIG. 3 illustrates an environment in which an equipment failure prediction system operates, according to some implementations.

As described above, equipment in a telecommunications network can fail when the equipment is subjected to certain environmental conditions. To predict the likelihood of equipment failure and to mitigate potential interruptions to network service caused by equipment failure, a telecommunications network operates an equipment failure prediction system. FIG. 3 illustrates an example environment 300 in which an equipment failure prediction system operates. As shown in FIG. 3, the environment 300 can include electronic devices 310, telecommunications equipment 320, the equipment failure prediction system 330, and one or more external servers 340.

User equipment devices, such as the electronic device 310, are configured to communicate over a telecommunications network. The user equipment devices establish communication sessions with access nodes in the network, through which the user equipment devices send or receive network data.

A telecommunications network is formed in part by equipment 320 that is located across a geographic area to service that geographic area. Such equipment can include radio access network equipment and backhaul equipment, such as network access nodes, radio equipment, routers, switches, optical equipment. At least some of the equipment is housed within a housing (referred to herein as an "equipment box") to protect the equipment from weather, animals, human tampering, or other forces that may damage the equipment. The boxes housing telecommunications equipment can each include one or more fans to help dissipate heat from the box. Fans can be placed inside a box or at an interface between the interior and exterior of the box to move air into or out of a box or past equipment inside the box to dissipate heat from the equipment.

The equipment failure prediction system 330 predicts when equipment in the telecommunications network is likely to fail and performs an action to either avoid equipment failure or to mitigate the effects of failure. The equipment failure prediction system 330 can include one or more computing devices that execute machine-readable instructions and are capable of communicating with external devices over a network 350, such as the telecommunications network or the Internet.

Generally, equipment housed inside an equipment box can fail when the equipment is subjected to sufficiently high or low temperatures for a sufficiently long period of time or to severe temperature fluctuations. The temperature inside an equipment box can be affected by numerous factors, including air temperature of the environment surrounding the box, performance of the fan inside the box, presence of wind or precipitation in the external environment, or properties of the equipment inside the box. Some or all of these parameters can therefore be used by the equipment failure prediction system 330 to predict when equipment is likely to fail.

The equipment failure prediction system 330 can evaluate data received from equipment in the telecommunications network or from external sources in order to predict when the equipment is likely to fail. Such data can include environmental conditions in an environment surrounding network equipment, such as air temperature, humidity, wind speed, precipitation, or air quality. The environmental condition data can be received from one or more external servers 340, such as servers associated with weather monitoring or forecasting services (e.g., the National Oceanic and Atmospheric Association (NOAA)), and can include current or past measurements of environmental conditions, forecasts for future environmental conditions, or both past measurements and forecasts. The equipment failure prediction system 330 can additionally or alternatively receive environmental condition measurements from sensors placed at or near the location of network equipment, such as temperature sensors, humidity sensors, wind speed sensors, air quality sensors, or precipitation sensors.

The data processed by the equipment failure prediction system 330 can also include attributes of fans inside network equipment boxes. Fans for network equipment boxes can be designed to maintain the temperature inside the box within a range that is acceptable for the equipment in the box, as long as the fan is operating normally. However, fans can fail. For example, a fan may be damaged by temperature fluctuations or physical forces such as water intrusion, occlusion by particulate matter, wear on gears or other mechanical components, or macroscopic forces (e.g., damage by trees, vehicles, humans, etc.). To detect whether fans are operating normally, the equipment failure prediction system 330 receives attributes of fans inside equipment boxes. Fan attributes can include fan speed data, optical measurements, or sound measurements that may indicate whether the fan is operating as expected or is exhibiting anomalous behavior. In some implementations, the equipment failure prediction system 330 detects fan anomalies in the network equipment boxes using an anomaly detection model. The model can be an analytical or machine learning-based model that receives fan attributes as input and detects whether the fan is exhibiting anomalous behavior. Alternatively, the equipment failure prediction system 330 can receive fan anomaly data from an external system that processes fan speed data to evaluate whether the fan is operating normally. Fan anomaly detection systems can be implemented on microcontrollers located inside equipment boxes, for example.

The equipment failure prediction system 330 can apply a trained machine learning model 335 to the environmental data and the fan attributes to predict failures of telecommunications network equipment caused by temperature conditions in the equipment boxes. A "model," as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of a certain set of telecommunications network equipment failing based on an analysis of environmental data and fan attribute data. Examples of models include neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the equipment failure prediction model 335 used by the system 330 can be a neural network with multiple input nodes that receive environmental parameters, such as air temperature measurements or forecasts, and fan attributes. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer ("the output layer"), one or more nodes can produce a value classifying the input that, once the model is trained, can be used as a likelihood that certain network equipment will fail. In some implementations, such neural networks, known as deep neural networks, can have multiple layers of intermediate nodes with different configurations, can be a combination of models that receive different parts of the input and/or input from other parts of the deep neural network, or are convolutions— partially using output from previous iterations of applying the model as further input to produce results for the current input.

The equipment failure prediction system 330 can obtain training datasets that include environmental data and fan attribute data associated with equipment in a telecommunications network, where the datasets are labeled according to whether the corresponding equipment failed within a certain amount of time after the datasets were obtained. The datasets in the training data can include datasets that are manually labeled by human analysts who confirm that the equipment failed due to temperature conditions inside equipment boxes. Additionally or alternatively, the training datasets can include datasets labeled as indicative of equipment failure or not indicative of equipment failure based on network performance metrics of the corresponding equipment. For example, if the equipment satisfied certain network performance metrics at or for a specified period of time after the environmental and fan data associated with a training dataset were obtained, the training dataset is labeled as an example that is not indicative of equipment failure.

The equipment failure prediction model 335 can be trained with supervised learning, where the training data includes the training datasets obtained by the equipment failure prediction system 330. A representation of a current or future environmental parameter and a fan attribute can be provided to the model. Output from the model (e.g., a predicted likelihood of failure) can be compared to the desired output for the combination of environmental and fan data and, based on the comparison, the model can be modified, such as by changing weights between nodes of the neural network or parameters of the functions used at each node in the neural network (e.g., applying a loss function). After applying each of the datasets in the training data and modifying the model in this manner, the model can be trained to evaluate new environmental data and fan attributes to generate predicted likelihoods of equipment failure.

Some implementations of the equipment failure prediction system 330 execute digital simulations of equipment boxes in order to simulate properties of physical equipment boxes under varying conditions. The digital simulation can use the trained machine learning model 335 to predict likelihoods of equipment failures under varying conditions. For example, the digital simulation can process a range of potential environmental and fan conditions using the trained model to evaluate combinations of conditions that are more or less likely to result in network equipment failure. Some implementations of the digital simulation further employ physics-based models, such as thermal models or thermo-mechanical models, to simulate temperature conditions inside network equipment boxes and to predict the effects these temperatures will have on the fans or network equipment inside the boxes.

In addition to predicting future equipment failures using the trained machine learning model, the equipment failure prediction system 330 can monitor network performance to detect actual equipment failures that were not accurately predicted by the model. Network performance metrics, such as network speeds, latency, throughput, packet loss, call drop rate, or call quality, can be received from electronic devices 310 communicating over the network or from other devices on the network. These performance metrics can be evaluated against performance thresholds that indicate whether the network equipment is operating as expected or has failed.

Predicting and Mitigating Telecommunications Network Equipment Failures

Figure 4:
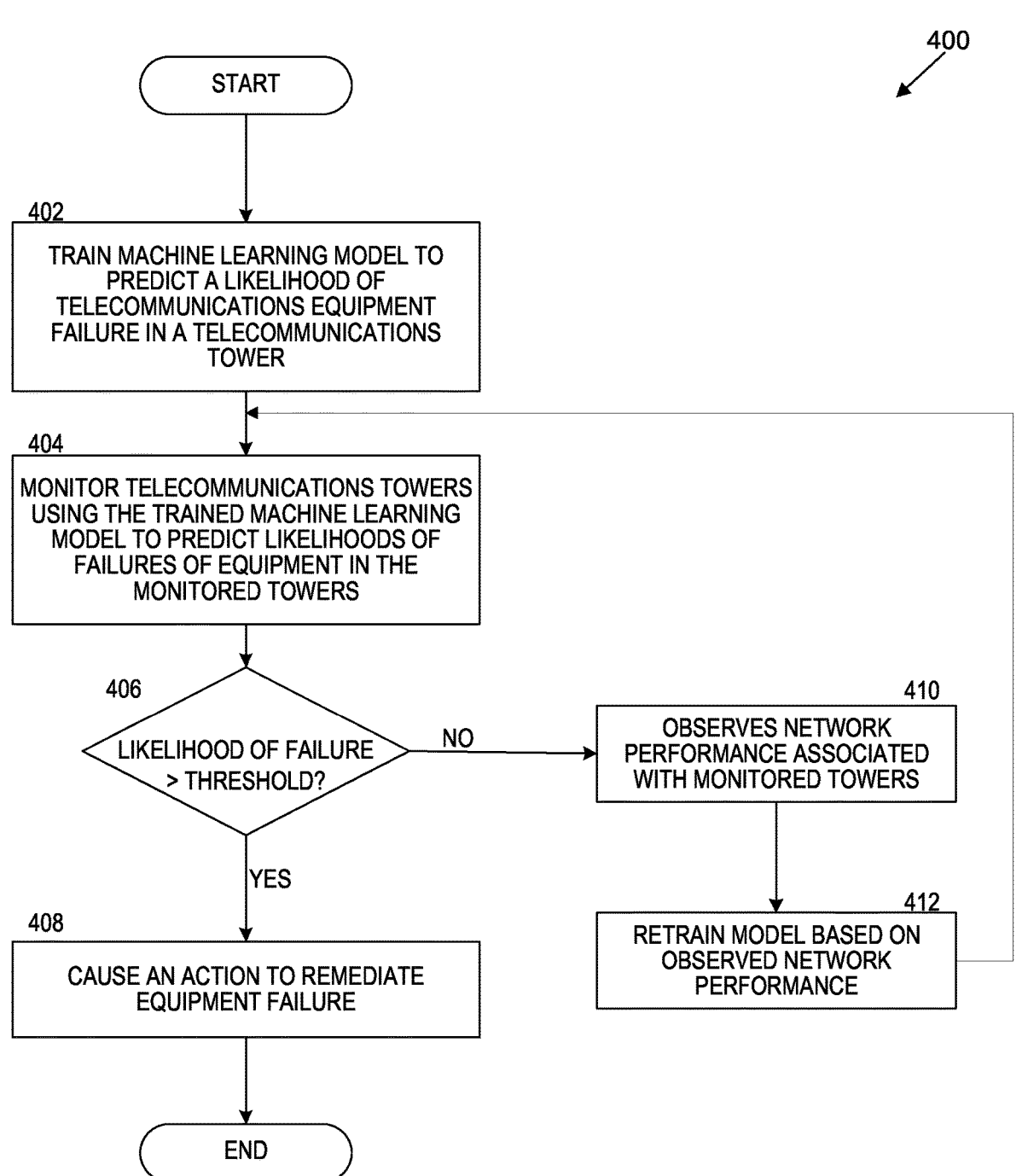
FIG. 4 is a flowchart illustrating a process for operating a model for predicting and mitigating equipment failures in a telecommunications network, according to some implementations.

FIG. 4 is a flowchart illustrating a process 400 for operating a model for predicting and mitigating equipment failures in a telecommunications network, according to some implementations. The process 400 can be performed by a computer system associated with the telecommunications network. Other implementations of the process 400 include additional, fewer, or different steps, or perform the steps in different orders.

At 402, the computer system trains a machine learning model to predict a likelihood of telecommunications equipment failure within telecommunications equipment boxes. The model can be trained to receive as input air temperature in environments proximate to the equipment boxes and attributes of any fans in the equipment boxes. The model can be trained to predict a probability that equipment in a particular box will fail within a certain time period. Alternatively, the model can be trained to predict a number of equipment boxes in a given region whose equipment is likely to fail within a certain time period. The computer system may obtain a trained machine learning model from another system rather than training the model itself. The computer system can perform fine-tuning on the trained model to improve the ability of the model to predict failure likelihoods under particular circumstances or for particular types of equipment.

At 404, the computer system monitors a set of telecommunications equipment boxes using the trained machine learning model in order to predict likelihoods of failures of the equipment in the monitored boxes. The computer system can continuously process environmental conditions, such as current or predicted air temperature, as well as fan attribute data associated with the monitored boxes using the trained model. Alternatively, air temperature data and fan attribute data can be processed periodically. For example, the computer system generates a set of predictions for likely failure of the monitored set of telecommunications equipment boxes at a frequency of once per day, using air temperatures predicted for the upcoming day and recent fan attribute data (e.g., fan speed measurements from the previous day). Furthermore, in some implementations, the computer system uses a digital simulation of an equipment box to simulate likely properties of the box under varying input conditions. The digital simulation can execute the trained machine learning model and/or physics-based models that evaluate properties of the simulated equipment box when subjected to simulated weather conditions or fan behaviors. The computer system can input air temperature measurements and fan attributes to the digital simulation to cause the simulation to predict likelihoods of equipment failures under the input conditions.

At 406, the computer system evaluates whether the likelihood of equipment failure predicted by the trained model is greater than a specified threshold. If the predicted likelihood is greater than the threshold, the computer system causes an action to remediate equipment failure (at 408). The action can include causing a portion of the network load supported by the equipment that is predicted to fail to be shifted to other telecommunications network equipment. For example, if a base station is among the equipment that is likely to fail, the computer system can send a command to the core network or the base station to shift network traffic from the base station to a nearby base station (or network node or equivalent) that is not as likely to fail.

Instead of or in addition to shifting the network load to other equipment, the action performed at 408 can include notifying customers of the telecommunications network that network performance is likely to suffer. The computer system can determine a set of user devices supported by the equipment that is predicted to fail. The set of user devices can be determined, for example, based on devices that are within a threshold proximity of the equipment that is predicted to fail at the time the prediction is made. Alternatively, the computer system can analyze historical travel patterns associated with user devices to determine a set of devices that are likely to be located within a threshold proximity of the equipment at a predicted time of failure. For example, if the computer system predicts that a particular base station will fail when the air temperature near the base station reaches its high temperature forecast on a given day, the computer system identifies devices that are likely to be located within the area serviced by the base station at the time the high temperature is likely to be reached or thereafter. A notification, such as a push notification, an email, or a short messaging service (SMS) message, can be sent to each of the determined devices to alert the users to potential interruptions to service beginning at the predicted time of failure. The users can therefore take an action if they expect to use significant network services at the predicted time of failure, such as moving to another location or reducing their expected network service utilization.

Another example action that can be caused at 408 when the predicted likelihood of failure is greater than the threshold is proactive servicing of the telecommunications network equipment. For example, the computer system can transmit an alert to a scheduling system associated with the telecommunications system to schedule a repair of the equipment that is predicted to fail prior to any failure occurring.

The action performed by the computer system at 408 can depend on the magnitude of the predicted likelihood that particular network equipment will fail. For example, if the likelihood is above a first threshold, the computer system can schedule repair or replacement of the affected equipment. If the likelihood is above a second threshold that is higher than the first threshold, the computer system can notify customers or shift network load to other equipment.

Furthermore, instead of determining that the likelihood of equipment failure is greater than a specified threshold, the computer system can evaluate whether the likelihood of failure falls within a specified range or falls outside a specified range, or whether a rate of change of the failure likelihood is greater than a threshold or within a specified range. Similarly, rather than evaluating equipment based on a likelihood of failure, the computer system can use a trained model to predict a likelihood that telecommunications equipment will not fail. This likelihood can be compared to corresponding thresholds or ranges in similar manners to cause the computer system to perform remediating actions.

At 410, the computer system observes network performance associated with the equipment housed in the equipment boxes being monitored with the trained model. The model can be retrained at 412 based on the observed network performance. In some implementations, the model is retrained based on an error value associated with the predicted likelihood of failure. The error value can represent a difference between the predicted likelihood output by the model and actual failure incidence measured using network performance observations. For example, when the predicted likelihood of failure of certain equipment is below the failure threshold but actual failure of network equipment is detected, the computer system can obtain a set of data that is used to retrain the model. The obtained data can include measurements of parameters at or leading up to the time of failure of the equipment, such as air temperature, humidity, wind speed, air quality, precipitation, fan speed, or fan anomalies. The obtained set of data can be labeled as a training example for which the predicted likelihood of failure that should be output by the model is 100%. The computer system can then retrain the model based on an error between the predicted likelihood output by the model and the expected likelihood of 100%. The error value can instead represent different variations between the predicted likelihood of failure and an expected value, such as a difference between the failure threshold and the predicted likelihood of failure.

Computer System

Figure 5:
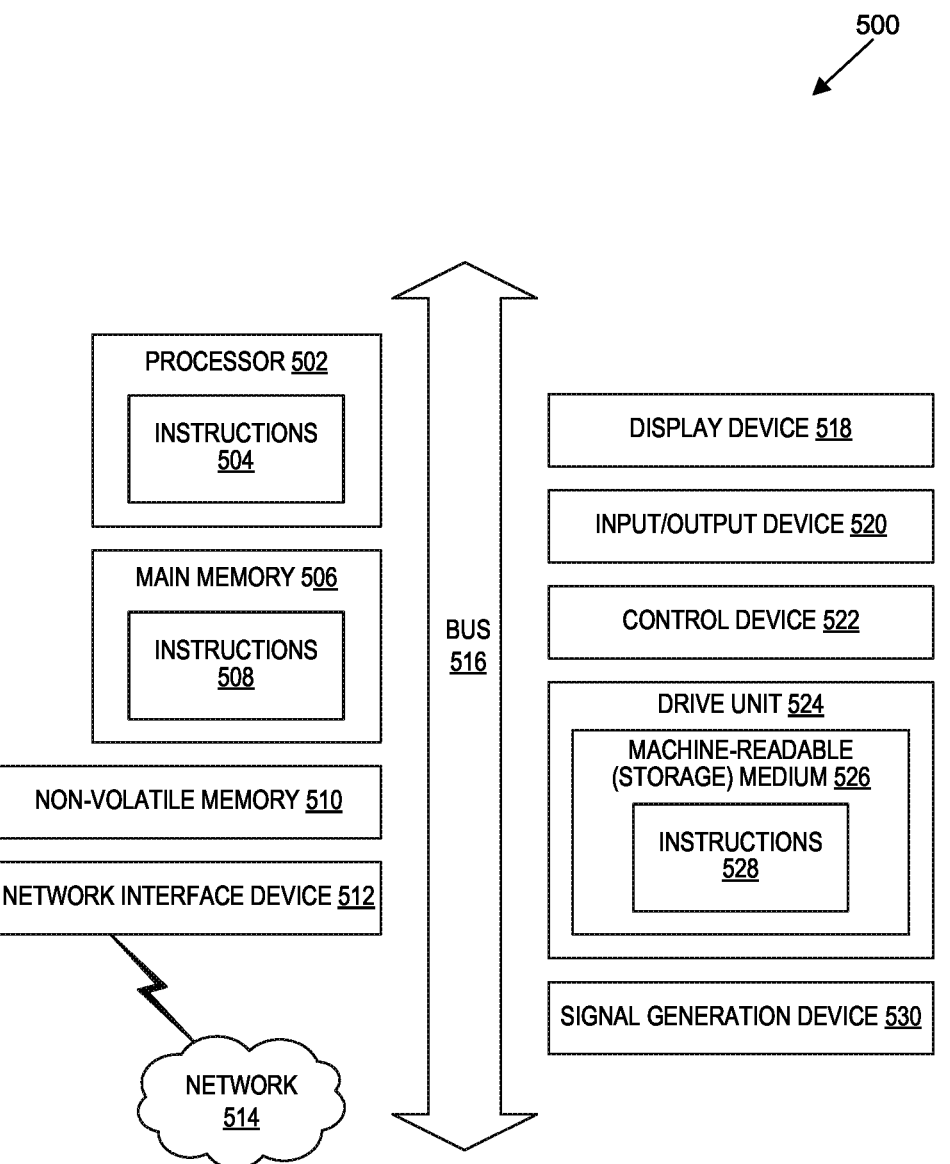
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, a video display device 518, an input/output device 520, a control device 522 (e.g., keyboard and pointing device), a drive unit 524 that includes a machine-readable (storage) medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementations, the computer system 500 can be an embedded computer system, a system-on-chip (SOC), a single-board computer system (SBC), or a distributed system such as a mesh of computer systems, or it can include one or more cloud components in one or more networks. Where appropriate, one or more computer systems 500 can perform operations in real time, in near real time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A system for predicting and mitigating failure of telecommunications network equipment, the system comprising:

at least one hardware processor; and at least one non-transitory memory storing instructions, which, when executed by the at least one hardware processor, cause the system to obtain a trained machine learning model that is configured to output a predicted likelihood of failure of telecommunications network equipment housed in equipment boxes based on (1) air temperature in an environment proximate to the equipment and (2) attributes of fans in the equipment boxes;

receive, for a set of equipment boxes, measurements of air temperature proximate to the equipment boxes in the set and attributes of fans in the equipment boxes in the set;

monitor the set of equipment boxes using the trained machine learning model by processing the received measurements of air temperature and attributes of fans to predict likelihoods of failure of the monitored equipment boxes;

observe network performance associated with telecommunications network equipment housed in the monitored equipment boxes; and upon detecting the observed network performance of telecommunications network equipment within a target equipment box of the monitored equipment boxes is below a performance threshold and detecting the predicted likelihood of failure of the target equipment box is below a failure threshold, retraining the trained machine learning model based on an error value associated with the predicted likelihood of failure.

2. The system of claim 1, wherein the instructions when executed by the at least one hardware processor further cause the system to:

when the predicted likelihood of failure of identified telecommunications network equipment in a monitored equipment box is greater than the failure threshold, cause at least a portion of a network load supported by the identified telecommunications network equipment to shift to other telecommunications network equipment.

16

3. The system of claim 1, wherein the instructions when executed by the at least one hardware processor further cause the system to:

when the predicted likelihood of failure of identified telecommunications network equipment in a monitored equipment box is greater than the failure threshold:

determine a set of user devices supported by the identified telecommunications network equipment; and generate a notification to the set of user devices to indicate a potential reduction to network performance based on the predicted likelihood of failure of the identified telecommunications network equipment.

4. The system of claim 1, wherein the instructions when executed by the at least one hardware processor further cause the system to:

when the predicted likelihood of failure of identified telecommunications network equipment in a monitored equipment box is greater than the failure threshold, generate an alert to cause scheduling of repair of the identified telecommunications network equipment.

5. The system of claim 1, wherein monitoring the set of equipment boxes using the trained machine learning model comprises:

executing a digital simulation of an equipment box, wherein the digital simulation employs the trained machine learning model to simulate properties of a physical equipment box under varying conditions; and inputting to the digital simulation, a measurement of air temperature in the environment proximate to one or more equipment boxes in the set of equipment boxes and a fan attribute associated with the one or more equipment boxes to cause the digital simulation to output a predicted likelihood of failure of the one or more equipment boxes.

6. The system of claim 1, wherein retraining the trained machine learning model comprises retraining the model using a retraining data set including precipitation data, wind data, humidity data, or air quality data.

7. The system of claim 1, wherein the attributes of fans in the monitored equipment boxes include measurements of fan speed of the fans.

8. The system of claim 1, wherein the attributes of fans in the monitored equipment boxes include fan anomalies detected for the fans.

9. The system of claim 8, wherein the instructions when executed by the at least one hardware processor further cause the system to:

obtain measurements of fan speed of the fans;

process the fan speed measurements using a fan anomaly detection model that is configured to output an indication of a fan anomaly based on the fan speed measurements; and provide the indication of the fan anomaly to the trained machine learning model for monitoring the monitored equipment boxes.

10. A non-transitory computer-readable storage medium comprising instructions recorded thereon, wherein the instructions when executed by at least one data processor of a system, cause the system to:

obtain a trained machine learning model that is configured to output a predicted likelihood of failure of telecommunications network equipment housed in equipment boxes based on (1) air temperature in an environment proximate to the equipment and (2) attributes of fans in the equipment boxes;

monitor a set of equipment boxes using the trained machine learning model to predict likelihoods of failure of the monitored equipment boxes;

observe network performance associated with telecommunications network equipment housed in the monitored equipment boxes; and upon detecting the observed network performance of telecommunications network equipment within a target equipment box of the monitored equipment boxes is below a performance threshold and detecting the predicted likelihood of failure of the target equipment box is below a failure threshold, retraining the trained machine learning model based on an error value associated with the predicted likelihood of failure.

11. The non-transitory computer-readable storage medium of claim 10, wherein the instructions when executed by the at least one data processor further cause the system to:

when the predicted likelihood of failure of identified telecommunications network equipment in a monitored equipment box is greater than the failure threshold, cause at least a portion of a network load supported by the identified telecommunications network equipment to shift to other telecommunications network equipment.

12. The non-transitory computer-readable storage medium of claim 10, wherein the instructions when executed by the at least one data processor further cause the system to:

when the predicted likelihood of failure of identified telecommunications network equipment in a monitored equipment box is greater than the failure threshold:

determine a set of user devices supported by the identified telecommunications network equipment; and generate a notification to the set of user devices to indicate a potential reduction to network performance based on the predicted likelihood of failure of the identified telecommunications network equipment.

13. The non-transitory computer-readable storage medium of claim 10, wherein the instructions when executed by the at least one data processor further cause the system to:

when the predicted likelihood of failure of identified telecommunications network equipment in a monitored equipment box is greater than the failure threshold, generate an alert to cause scheduling of repair of the identified telecommunications network equipment.

14. The non-transitory computer-readable storage medium of claim 10, wherein the instructions when executed by the at least one data processor further cause the system to:

executing a digital simulation of an equipment box, wherein the digital simulation employs the trained machine learning model to simulate properties of a physical equipment box under varying conditions; and inputting to the digital simulation, a measurement of air temperature in the environment proximate to one or more equipment boxes in the set of equipment boxes and a fan attribute associated with the one or more equipment boxes to cause the digital simulation to output a predicted likelihood of failure of the one or more equipment boxes.

15. A method for predicting and mitigating failure of telecommunications network equipment, the method comprising:

obtaining trained machine learning model that is configured to output a predicted likelihood of failure of telecommunications network equipment housed in equipment boxes based on (1) air temperature in an environment proximate to the equipment and (2) attributes of fans in the equipment boxes;

monitoring a set of equipment boxes using the trained machine learning model to predict likelihoods of failure of the monitored equipment boxes;

observing network performance associated with telecommunications network equipment housed in the monitored equipment boxes; and when the predicted likelihood of failure of identified telecommunications network equipment in a monitored equipment box is greater than a failure threshold, causing at least a portion of a network load supported by the identified telecommunications network equipment to shift to other telecommunications network equipment.

16. The method of claim 15, further comprising:

upon detecting the observed network performance of telecommunications network equipment within a target equipment box of the monitored equipment boxes is below a performance threshold and detecting the predicted likelihood of failure of the target equipment box is below the failure threshold, retraining the trained machine learning model based on an error value associated with the predicted likelihood of failure.

17. The method of claim 15, further comprising:

when the predicted likelihood of failure of identified telecommunications network equipment in a monitored equipment box is greater than the failure threshold:

determining a set of user devices supported by the identified telecommunications network equipment; and generating a notification to the set of user devices to indicate a potential reduction to network performance based on the predicted likelihood of failure of the identified telecommunications network equipment.

18. The method of claim 15, further comprising:

when the predicted likelihood of failure of identified telecommunications network equipment in a monitored equipment box is greater than the failure threshold, generating an alert to cause scheduling of repair of the identified telecommunications network equipment.

19. The method of claim 15, further comprising:

executing a digital simulation of an equipment box, wherein the digital simulation employs the trained machine learning model to simulate properties of a physical equipment box under varying conditions; and inputting to the digital simulation, a measurement of air temperature in the environment proximate to one or more equipment boxes in the set of equipment boxes and a fan attribute associated with the one or more equipment boxes to cause the digital simulation to output a predicted likelihood of failure of the one or more equipment boxes.

20. The method of claim 15, wherein the attributes of fans in the monitored equipment boxes include fan anomalies detected for the fans, and wherein the method further comprises:

obtaining measurements of fan speed of the fans;

processing the fan speed measurements using a fan anomaly detection model that is configured to output an indication of a fan anomaly based on the fan speed measurements; and providing the indication of the fan anomaly to the trained machine learning model for monitoring the monitored equipment boxes.

\* \* \* \* \*